United States Patent Office 3,240,294
Patented Mar. 15, 1966

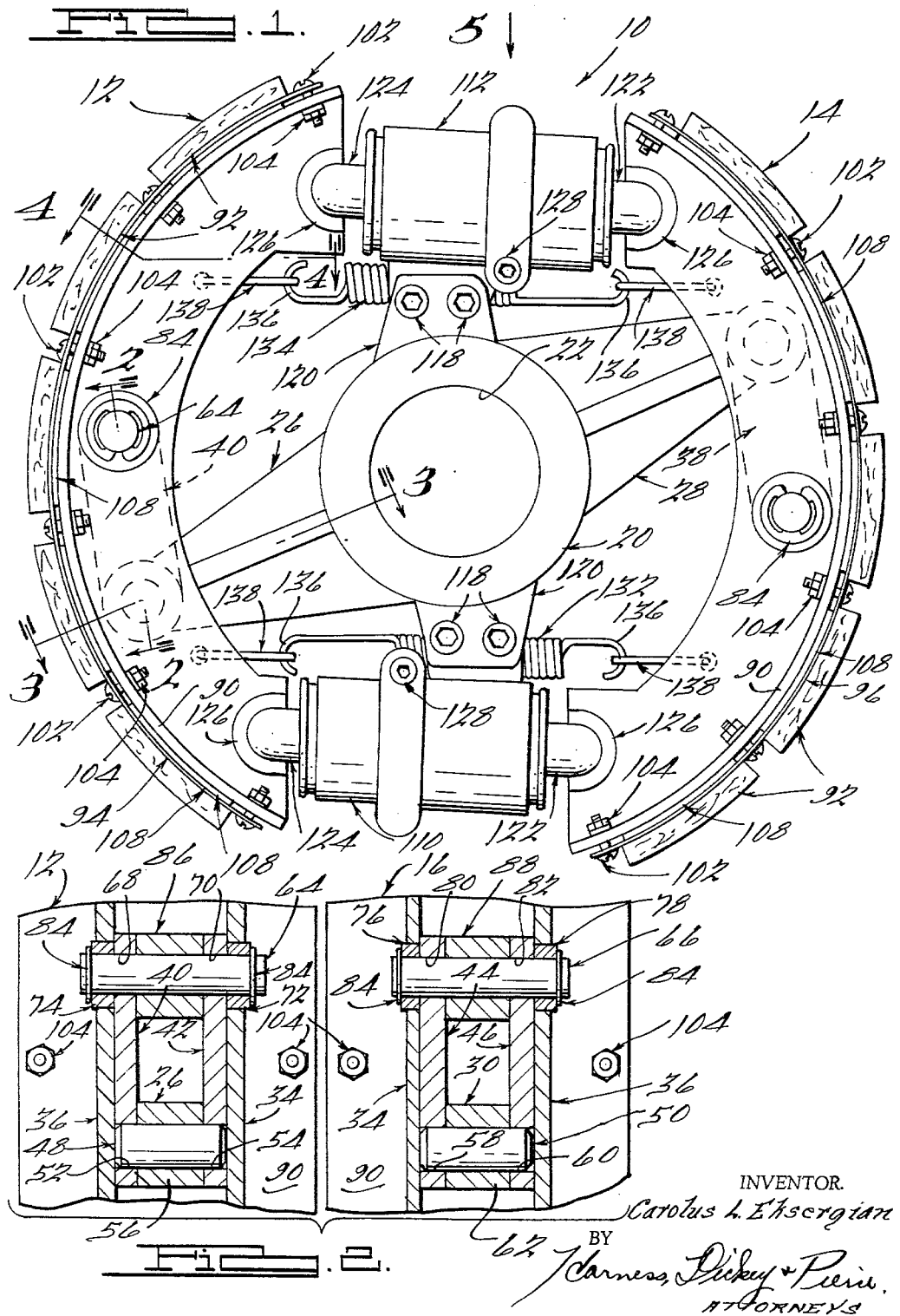

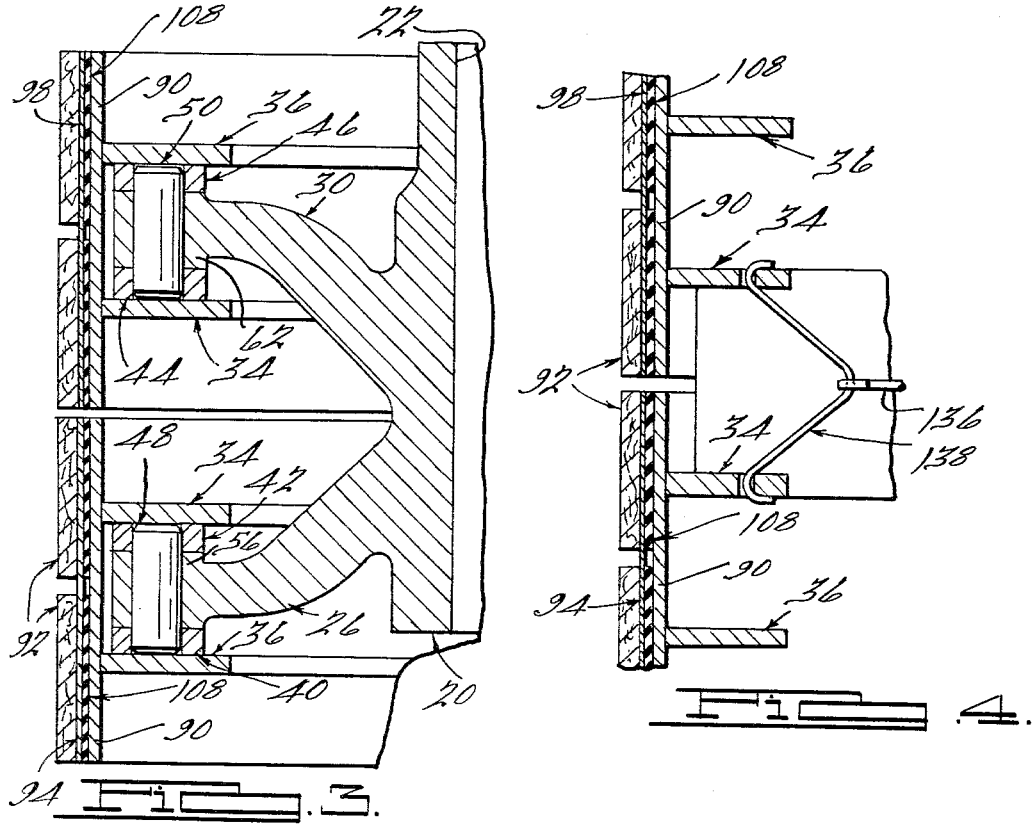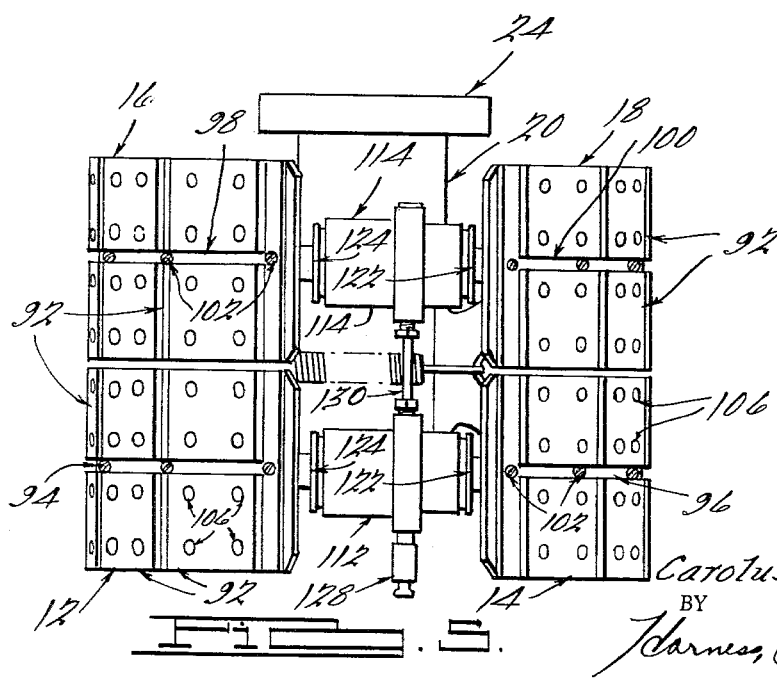

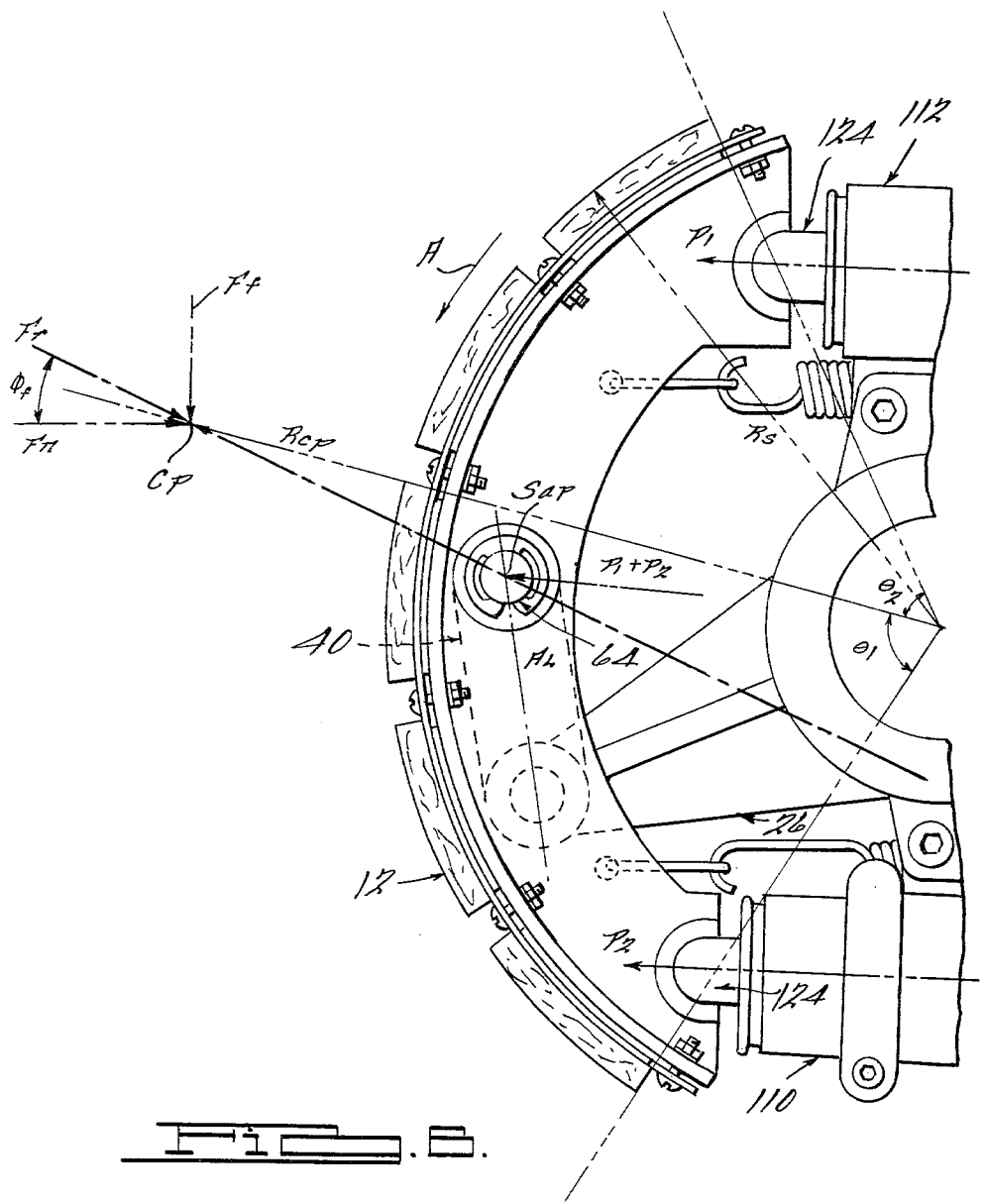

3,240,294
BRAKE CONSTRUCTION
Carolus L. Eksergian, Media, Pa., assignor to Kelsey-Hayes Company, Romulus, Mich., a corporation of Delaware
Filed Sept. 19, 1963, Ser. No. 310,022
7 Claims. (Cl. 188—78)

This invention relates generally to a braking mechanism, and more particularly, to an internally expanding brake mechanism incorporating a plurality of individual arcuate brake shoes each adapted to be biased outwardly into operative engagement with a conventional brake drum.

It has heretofore been the practice in the construction of internally expanding automotive brakes to provide one or more brake shoes having a brake lining for friction-material mounted on the arcuate brake drum-engaging portion thereof. Because the frictional characteristics of the lining material varies with temperature, pressure, humidity and rubbing velocity, the torque resisting characteristics or braking efficiency of such brake mechanisms are subject to considerable variation. However, these variations (due to friction alone) are usually not considered inordinate enough to affect the stability or dependability of the brake assemblies; instead, the primary concern arises from the magnification of such variations brought about by a characteristic known as "heat checking" which results from peak pressure concentrations existing between the brake shoes and their associated brake drum assembly. It has been found that the most effective method of minimizing these peak pressure concentrations, and consequently the aforementioned "heat checking" effects, is to provide a brake mechanism wherein a uniform bearing pressure exists throughout the entire arcuate length and width of engagement between each of the brake shoes and drum assembly thereof.

Accordingly, the present invention is directed towards a novel brake mechanism incorporating therein a plurality of brake shoes each of which is adapted to exert a uniform pressure along its entire arcuate length and width thereby substantially obviating the existence of any peak pressure concentrations effectuating the aforementioned "heat checking" characteristics. Such a result is provided by symmetrically anchoring the individual brake shoes with respect to the loading applied thereby and such that each brake shoe is free to differentially travel as dictated by the instantaneous drum distortions. Furthermore, the individual brake shoes are connected to a central anchor support by a plurality of floating links secured thereto in accordance with a geometrical relationship corresponding to the coefficient of friction of the shoe linings and the resultant of the applied forces exerted thereby.

It is therefore the primary object of the present invention to provide an improved brake mechanism of the above character which exhibits substantially constant torque resistant characteristics.

It is another object of the present invention to provide an improved brake mechanism of the above character wherein the individual brake shoes thereof exert a substantially uniform bearing pressure along their entire arcuate length and width thereby minimizing any peak pressure concentrations.

It is still another object of the present invention to provide an improved brake mechanism of the above character wherein the individual brake shoes are operatively secured to a central anchor support in accordance with a geometrical relationship corresponding to the coefficient of friction of the shoe lining and the resultant of the applied forces exerted thereby.

It is yet another object of the present invention to provide an improved brake mechanism of the above character wherein the individual brake shoes are independently anchored so as to be free to differentially travel as dictated by the instantaneous brake drum distortions.

Other objects and advantages of the present invention will become apparent from the following detailed description taken in conjunction with the accompanying drawings, wherein:

FIGURE 1 is a side elevational view of an exemplary embodiment of the improved brake mechanism of the present invention;

FIGURE 2 is a fragmentary cross-sectional view of the structure illustrated in FIGURE 1, taken substantially along the line 2—2 thereof;

FIGURE 3 is a fragmentary cross-sectional view taken along the line 3—3 of FIGURE 1;

FIGURE 4 is a fragmentary cross-sectional view taken substantially along the line 4—4 of FIGURE 1;

FIGURE 5 is a top elevational view of the brake mechanism illustrated in FIGURE 1, taken in the direction of the arrow 5 thereof; and FIGURE 6 is a side elevational view of the brake mechanism of the present invention illustrating the geometrical relationship existing between the various components thereof.

Referring now to FIGURE 1 of the drawings, a brake mechanism 10, in accordance with an exemplary embodiment of the present invention, includes two pair of axially aligned symmetrically oriented arcuate brake shoes 12, 14, 16 and 18, each of which is adapted to operatively engage a conventional cylindrical brake drum assembly (not shown). An annular hub or anchor support member 20, having an axially extending aperture 22 formed therethrough and a radially outwardly extending collar 24 disposed on one end portion thereof, is concentrically disposed interjacent the brake shoes 12, 14, 16 and 18, and is adapted to operatively secure the brake mechanism 10 to a stationary portion of the vehicle's axle structure, for example, a suitable axle flange (not shown). A plurality of arcuately configured shoe support arms 26, 28, 30 and 32 extend radially outward from the annular hub 20 to a position interjacent a pair of radially extending reinforcing members, generally designated by the numerals 34 and 36, formed on the radially innermost surfaces of each of the shoes 12, 14, 16 and 18.

Referring now to FIGURES 1 through 3, each of the brake shoes 12, 14, 16 and 18 is operatively connected to its respective shoe support arms 26, 28, 30 and 32 by two of a plurality of spaced parallel brake shoe anchoring links, two of which are illustrated by the dotted lines in FIGURE 1 interconnecting the brake shoes 12 and 14 to the support arms 26 and 28 respectively, and which are designated by the numerals 38 and 40. As representatively illustrated in FIGURE 2, the anchor link 40 and associated link 42, together with a second pair of anchor links 44 and 46, are pivotably connected to the support arms 26 and 30 by a pair of cylindrical pivot pins 48 and 50, respectively. The pivot pin 48 extends through a pair of complementary shaped axially aligned apertures 52 and 54 formed in the anchor links 40 and 42 respectively, and an axially extending cylindrical sleeve portion 56 formed on the radially outermost end portion of the support arm 26. Accordingly, the pivot pin 50 extends through similar apertures 58 and 60 formed in the anchor links 44 and 46 respectively, and a sleeve portion 62 formed on the radially outermost end portion of the support arm 30. It will be noted that the pivot pins 48 and 50 are retained within their respective apertures hereinbefore specifically described by the radially extending reinforcing members 34 and 36 on each of the brake shoes 12 and 16.

As best seen in FIGURE 2, the end portions of each of the anchor links 40, 42, 44 and 46 opposite those which are respectively connected to the support arms 26 and 30 are pivotably secured to the brake shoes 12 and 16 by a pair of cylindrical pivot pins 64 and 66, respectively. The pivot pin 64 extends through a pair of axially aligned apertures 68 and 70 formed in anchor links 40 and 42, and through a pair of axially aligned sleeve bushings 72 and 74 respectively, disposed within the reinforcing members 34 and 36 for mitigating the frictional forces resisting relatively free pivotal movement between the pivot pin 64 and the reinforcing members 34 and 36. Similarly, the pivot pin 66 extends through a pair of axially aligned sleeve bushings 76 and 78 disposed in the reinforcing members 34 and 36 of the brake shoe 16, and through a pair of axially aligned apertures 80 and 82 formed in the anchor links 44 and 46, respectively. A plurality of conventional snap rings, generally designated by the numeral 84, are provided one on each end of each of the pivot pins 64 and 66 to preclude the axial movement thereof within their respective bushings 72, 74 and 76, 78. A plurality of hollow cylindrical spacers, two of which are illustrated in FIGURE 2 and designated by the numerals 86 and 88, are provided interjacent the end portions of each pair of anchor links pivotably connected to the reinforcing members 34 and 36 of the brake shoes 12, 14, 16 and 18, which spacer members are adapted to operatively maintain the respective pairs of shoe anchor links in a general spaced parallel relationship.

Referring now to FIGURES 1 and 5, the brake shoes 12, 14, 16 and 18, each of which includes an arcuately shaped rim portion, generally designated by the numeral 90, are provided with a multiplicity of rectangularly shaped blocks 92 fabricated of a conventional heat and wear resistant brake lining material. A plurality of thin flexible sheet metal plates 94, 96, 98 and 100, each of the same general conformation as the rim portions 90 of the brake shoes 12, 14, 16 and 18, are respectively secured to the outer peripheries thereof by a plurality of machine screws 102 and nuts 104, and to which the lining blocks 92 are secured in a generally circumferentially spaced and axially aligned relationship by a plurality of sheer pins, generally designated by the numeral 106.

As best seen in FIGURE 1, a plurality of circumferentially spaced deformable mounting pads 108, constructed of a relatively resilient deformable material such as rubber or the like, is interposed between the adjacent surfaces of each of the flexible plates 94, 96, 98 and 100 and the brake shoe rim portions 90 subjacent each of the blocks 92. It will be seen that by virtue of this flexibility of support, each lining block 92 is independently free to orient itself both circumferentially and laterally to comply with the instantaneous deformations on the inner periphery of the brake drum assembly. Furthermore, each of the individual lining blocks 92 is independently free to move radially inwardly and outwardly relative to the adjacent blocks 92 without producing any significant variation in the total or overall bearing pressure applied against the rotating brake drum by the brake shoes 12, 14, 16 and 18 thus assuring a substantially uniform application load along the entire arc length and width of each of the brake shoes 12, 14, 16 and 18.

A plurality of conventional brake shoe actuating cylinders 110, 112, 114 and 116 (the latter not being shown) is provided one interposed between the adjacent end portions of each of the diametrically opposed pairs of brake shoes 12, 14 and 16, 18, to operatively bias the brake shoes 12, 14, 16 and 18 into engagement with their associated brake drum assembly. The actuating cylinders 110, 112, 114 and 116, each of which is secured by a pair of screw elements 118 to one of a plurality of radially outwardly extending flanges 120 formed on the annular hub member 20, are of a conventional multiple direction expanding construction, and each comprises a pair of opposing piston members (not shown) adapted to operatively bias a pair of piston rods, representatively designated by the numerals 122 and 124, extending between the opposite ends thereof and a pair of semi-cylindrical bushings or bearing elements 126 disposed within the end portions of the brake shoes 12, 14, 16 and 18. A conventional valve means 128 is provided on the actuating cylinders 110 and 112 for receiving a suitable conduit communicating pressurized hydraulic fluid to the cylinders 110 and 112 to effectuate the actuation thereof. FIGURE 5 illustrates one of a pair of conduits 130 adapted to communicate hydraulic fluid from the cylinders 110 and 112 to the cylinders 114 and 116 respectively, thereby effecting concomitant actuation of the cylinders 110, 114 and the cylinders 112, 116 such that simultaneous actuation of the brake shoes 12, 16 and 14, 18 is achieved.

A pair of retracting springs 132 and 134 is provided within the brake mechanism 10 to resiliently constrain the brake shoes 12, 14, 16 and 18 from operative engagement with the inner periphery of their associated brake drum assembly during normal transport operation. Each of the retracting springs 132 and 134 is provided with a pair of arcuate end portions, generally designated 136, each of which is operable to engage one of a plurality of generally V-shaped connecting brackets 138 extending between the adjacent of the radially extending reinforcing members 34 and 36 of the brake shoes 12, 14 and 16, 18, thereby enabling the retracting springs 132 and 134 to concurrently constrain each of the brake shoes 12, 14, 16 and 18.

Referring now to FIGURE 6, actuation of the cylinders 110 and 112 upon appropriate introduction of hydraulic pressure thereto results in the piston rods 124 thereof being biased simultaneously outward and exerting the forces $P_1$ and $P_2$ against the brake shoe 12. The magnitude of the sum or application resultant of the forces $P_1$ and $P_2$ acts along the line $P_1+P_2$ extending outwardly through the center of the pivot pin 64 hereinafter specifically designated as the anchor point $S_{ap}$ of the brake shoe 12. It will be noted that since the magnitudes of the applied forces $P_1$ and $P_2$ are not equal, the resultant force $P_1+P_2$ does not lie on the bisectrix of the angle subtended by the arcuate length of the brake shoe 12, which angle is herein designated by the sum of the angles $\Theta_1$ plus $\Theta_2$.

As representatively illustrated in FIGURE 6 by the symbol $F_n$, the drum reaction force produced by the application resultant $P_1+P_2$ lies along a line extending through a point known to those skilled in the art as the center of pressure, herein designated $C_p$. Briefly, the center of pressure $C_p$ is a function of the active arc length and radius of the brake shoe 12 ($R_s$) or, in other words, is a function of the angle subtended by the sum of the angles $\Theta_1+\Theta_2$ and the radius $R_s$, and is located on a radial line defined by the empirical equation:

$$R_{cp} = R_s \left[ \frac{\Theta_2 - \Theta_1}{\sin \Theta_2 - \sin \Theta_1} \right]$$

Assuming a counterclockwise drum rotation, as illustrated by the arrow A in FIGURE 6, the frictional or torque resistant force produced upon operative engagement of the brake shoe 12 with the rotating drum assembly is represented by the line $F_f$, which force also acts through the point $C_p$ and cooperates with the reaction force $F_n$ to produce a resultant force $F_r$. It will be seen that the longitudinal axis of the link 40, represented by the line $A_l$, intersects the application resultant force $P_1+P_2$ at a point lying on a line colinear with the resultant force $F_r$, this point hereinbefore being designed as the brake shoe anchor point $S_{ap}$. By so locating the shoe anchor point $S_{ap}$, it has been found that the center of pressure $C_p$ will lie along a radial line bisecting the angle subtended by the arc length of the brake shoe 12, that is, along a line $R_{cp}$ wherein the angle $\Theta_1$ equals $\Theta_2$. Accordingly, since it is known that when the center of pressure lies on the bisectrix of the active arc length of the brake shoe, both symmetrical bearing pressure and wear characteristics are attained, it is possible by knowing certain readily determined physical parameters to provide a brake mechanism that is adapted to apply a substantially uniform pressure along the entire arcuate length and width of each of the brake shoes thereof, thus limiting the torque variations of the brake mechanism to the frictional variations of the lining material employed therein.

In resume, by knowing the coefficient of friction of the lining material, herein determined as the tangent of the angle $\Phi_f$ between a radial line ($R_{cp}$) extending through the point $C_p$ and the line $F_n$, and by knowing the active arc length of the brake shoe 12 and the resultant force $P_1+P_2$ applied thereby, the anchor point $S_{ap}$ may be exactly determined at the intersection of the link axis $A_1$, the line of action of the force $P_1+P_2$ and the resultant force $F_r$, thereby assuring that the center of pressure $C_p$ lies on the radial line $R_{cp}$ wherein the angles $\Theta_1$ and $\Theta_2$ are equal and thereby obviating the aforediscussed torque variations produced by the existence of any "heat checking" characteristics.

While it will be apparent that the preferred embodiment illustrated herein is well calculated to fulfill the objects stated, it will be appreciated that the invention is susceptible to modification, variation and change without departing from the proper scope or fair meaning of the subjoined claims.

I claim:

1. In a brake mechanism, a plurality of circumferentially arranged frictional elements, a plurality of actuating cylinders for operatively biasing each of said elements outwardly into engagement with a suitable brake drum assembly, and support means including a central hub member having a plurality of support arms extending radially outward therefrom, each of said arms having link means interconnecting the outer end portion thereof with one of said frictional elements, said link means being pivotably secured at one end to said frictional elements at a position on said elements determined by a first force vector defined by the magnitude and direction of the forces exerted thereon by the adjacent of said actuating cylinders and by a second force vector defined by the magnitude and direction of the resultant force of the reaction and frictional forces created as said elements are biased into engagement with said brake drum assembly.

2. In a brake mechanism, two pair of circumferentially aligned diametrically opposed and radially applied arcuate brake shoes, each of said brake shoes having friction means on the radially outermost portion thereof, a plurality of actuating cylinders one interposed between the adjacent end portions of each of said pair of diametrically opposed brake shoes, a central annular hub having a plurality of diametrically opposed brake shoe support arms extending radially outward therefrom, a plurality of anchor links interconnecting each of said brake shoes with one of said shoe support arms, and spring means adapted to concomitantly retract said pair of diametrically opposed brake shoes, each of said anchor links being connected to one of said brake shoes at a position pivotally secured at one end to said frictional element at a position on said elements determined by a first force vector defined by the magnitude and direction of the forces exerted thereon by the adjacent of said actuating cylinders and by a second force vector defined by the magnitude and direction of the resultant force of the reaction and frictional forces created as said elements are biased into engagement with said brake drum assembly.

3. A brake mechanism as set forth in claim 2 wherein said friction means on the radially outermost portions of each of said brake shoes includes a multiplicity of resiliently mounted circumferentially spaced friction elements.

4. In a brake mechanism, a friction element, actuating means for biasing said element into engagement with an associated brake drum assembly and thereby apply a braking force of a predetermined magnitude and direction against said assembly, and support means for supporting said element adjacent said assembly, said support means comprising a hub member and link means secured at one end to said hub member and at the opposite end to said element, said opposite end of said link means being secured to said element at a position on said element determined by the intersection of a first force vector defined by the magnitude and direction of said braking force and of a second force vector defined by the magnitude and direction of the resultant force of the reaction and frictional forces created as said element is biased into engagement with said assembly.

5. In a device for restricting rotative movement of a rotating member, a friction element engageable with the member, nonrotatable means adapted to support said element adjacent the member, piston means adapted to exert a force urging said element into engagement with the member, and link means interconnecting said element with said nonrotatable means, said link means being secured at one end to said nonrotatable means and being secured at the opposite end to said element at a position on said element determined by the intersection of a first force vector defined by the magnitude and direction of the force exerted by said piston means and of a second force vector determined by the magnitude and direction of the resultant force of the reaction and frictional forces created as said element is urged into engagement with said nonrotatable member, whereby said element applies a uniform pressure against said nonrotatable member.

6. In a brake mechanism, an arcuate brake shoe, first and second piston means located one at each end of said brake shoe for operatively biasing said shoe into engagement with an associated brake drum assembly, hub means for supporting said shoe adjacent the drum assembly, and a support link pivotably connecting said shoe to said hub means and being secured to said shoe at a position determined by the intersection of a first force vector defined by the magnitude and direction of the summation of the forces exerted by said first and second piston means, and of a second force vector defined by the magnitude and direction of the resultant force of the reaction and frictional forces created as said shoe is biased into engagement with the drum assembly.

7. In a brake mechanism, an arcuate brake shoe having friction means on the radially outermost portion thereof, the radial distance between the center of the mechanism and the outer periphery of said friction means defining a radius $R_s$, a shoe support member, first and second piston members arranged one at each end of said shoe and adapted to exert predetermined forces against the ends of said shoe whereby said shoe is urged into engagement with an associated brake drum assembly, a link member interconnecting said shoe with said support member and being secured to said shoe at a position determined by the intersection of first and second force vectors, said first vector being defined by the magnitude and direction of the resultant force of the forces exerted by said first and second pistons against said shoe, said second force vector intersecting the center of pressure of said shoe, said center of pressure lying on a first radial line at a radius determined by the formula $$R_s \frac{\Theta_2 - \Theta_1}{\sin \Theta_2 - \Theta_1}$$

where $\Theta_1$ is equal to the angle between said first radial line and a second radial line intersecting the line of force of said first piston member and where $\Theta_2$ is equal to the angle between said first radial and a third radial line intesecting the line of force of said second piston member, whereby said friction means exerts a uniform pressure against the brake drum assembly along the entire arcuate length of said shoe.

(References on following page)

References Cited by the Examiner

UNITED STATES PATENTS

| | | | |
|---|---|---|---|
| 1,917,993 | 7/1933 | Morris | 188—250 |
| 2,137,991 | 11/1938 | La Londe | 188—78 X |
| 2,207,421 | 7/1940 | Tirabasso | 188—78 X |

FOREIGN PATENTS 595,774   7/1925   France.

MILTON BUCHLER, *Primary Examiner.*

RALPH D. BLAKSLEE, ARTHUR L. LA POINT,
*Examiners.*